J. H. BRODIE.
MIXER.
APPLICATION FILED FEB. 26, 1912.
1,027,982.
Patented May 28, 1912.
3 SHEETS—SHEET 1.
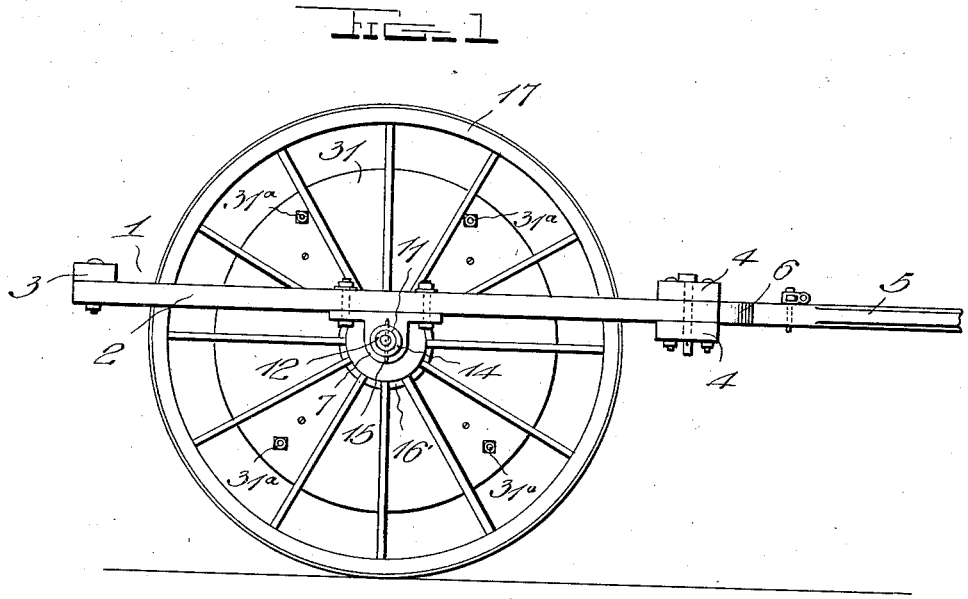
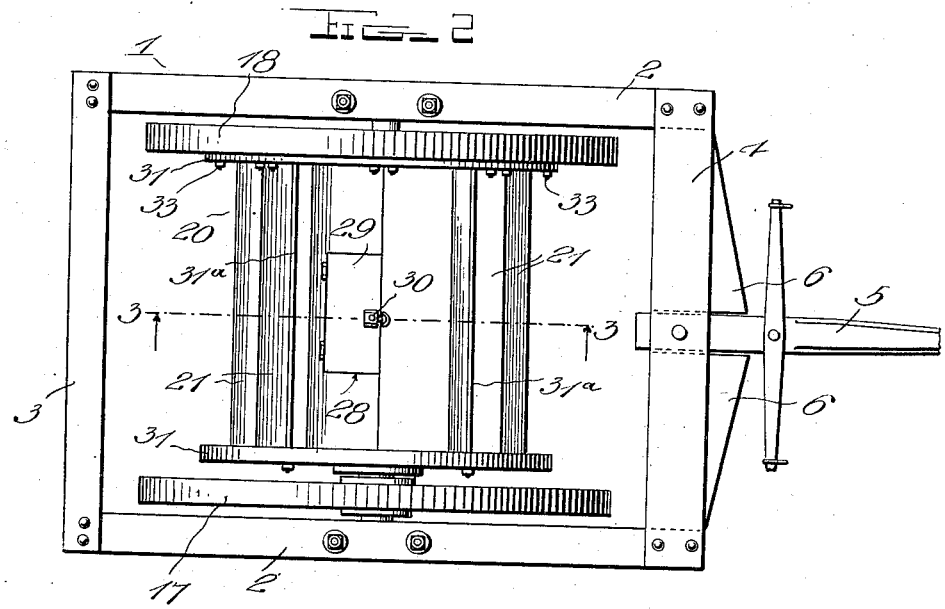
Witnesses
Inventor
J. H. Brodie
by H. B. Willson & Co.
Attorneys

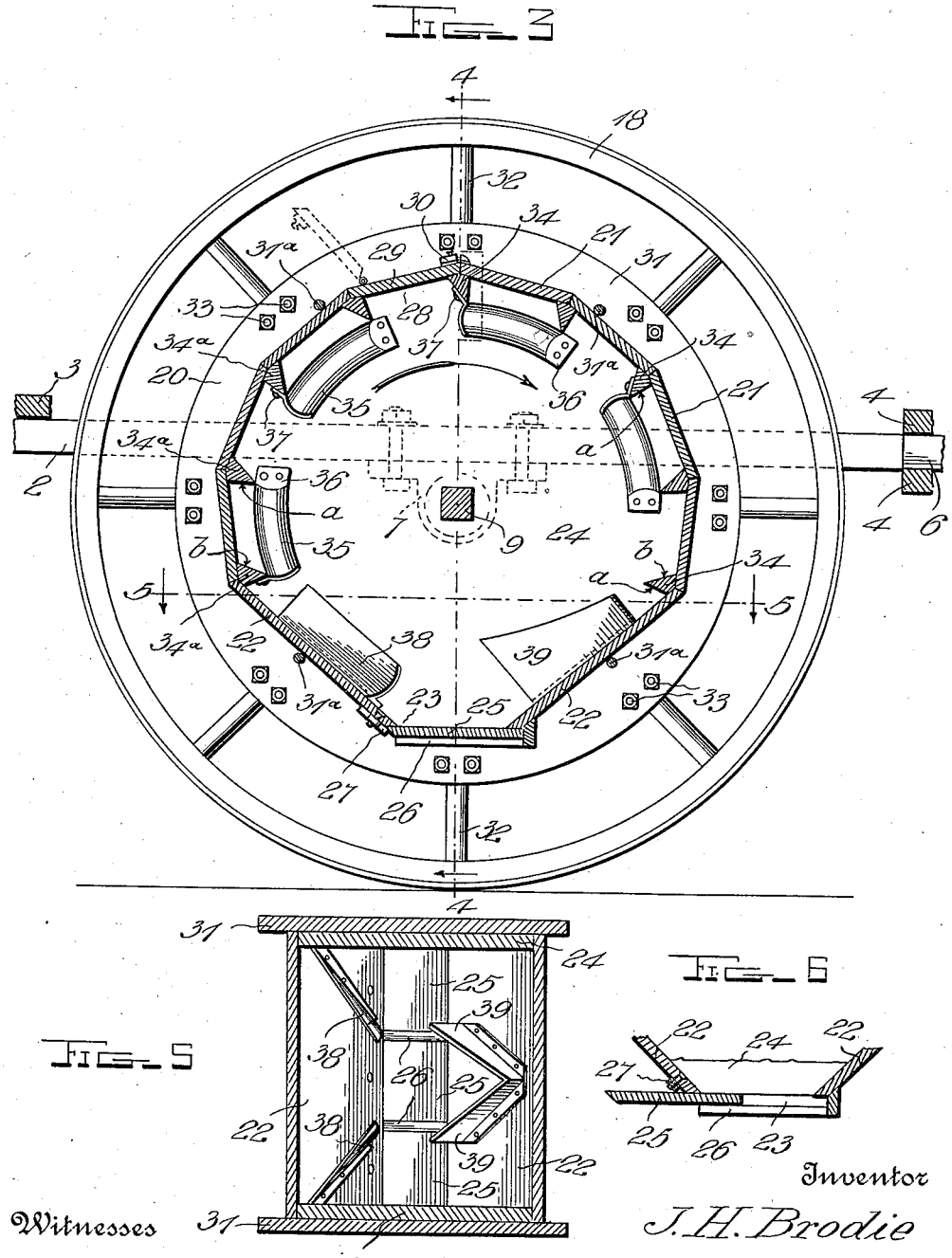

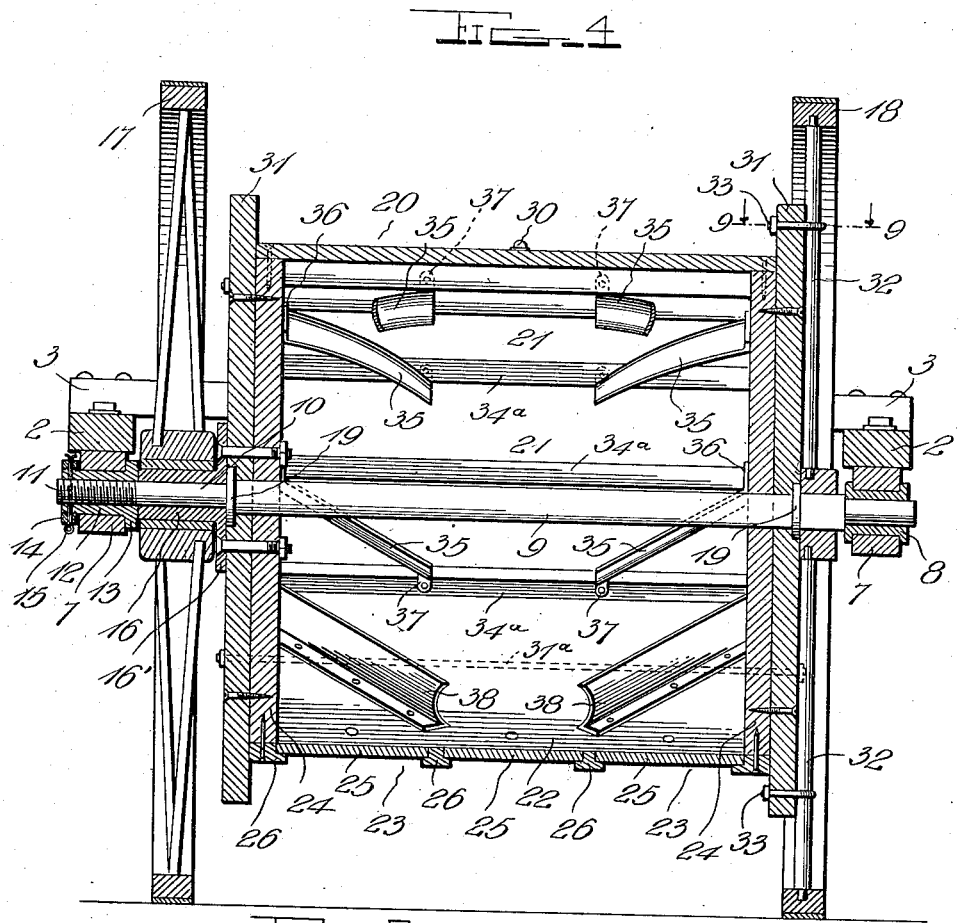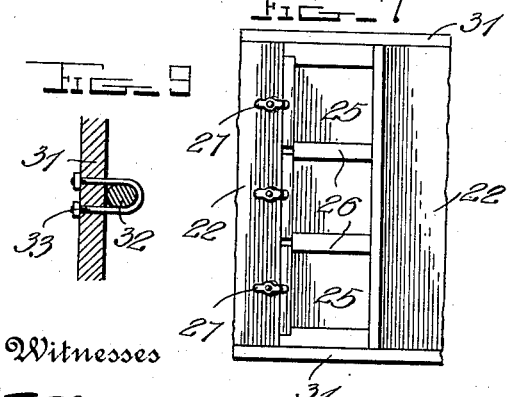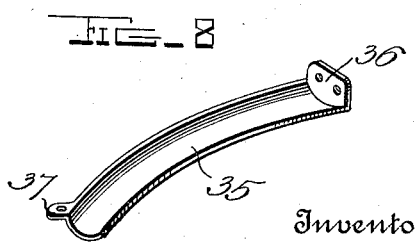

UNITED STATES PATENT OFFICE.

JAMES H. BRODIE, OF HENDERSON, NORTH CAROLINA.

MIXER.

1,027,982.  Specification of Letters Patent.  Patented May 28, 1912.

Application filed February 26, 1912. Serial No. 679,869.

*To all whom it may concern:*

Be it known that I, JAMES H. BRODIE, a citizen of the United States, residing at Henderson, in the county of Vance and State of North Carolina, have invented certain new and useful Improvements in Mixers; and I do declare the following to be a full, clear, and exact description of the invention, such as will enable others skilled in the art to which it appertains to make and use the same.

This invention relates to improvements in mixers, more especially designed for use in mixing fertilizers, but which may be used for mixing mortar, cement, or other material.

In the preferred embodiment of the invention the mixer is shown mounted on a cart.

One object of the invention is to provide a combined mixer and cart having a mixing receptacle adapted to be actuated by the movement of the cart whereby the material placed therein will be thoroughly mixed while the cart is being drawn from place to place.

Another object is to provide a device of this character having a receptacle provided with an improved construction and arrangement of agitating and deflecting devices whereby the material in the receptacle is continuously thrown from the outer sides of the same toward the center and which will direct the material to the discharge openings in the receptacle when the latter is turned to a position for discharging the contents therefrom.

With these and other objects in view the invention consists of certain novel features of construction, and the combination and arrangement of parts as will be more fully described and claimed.

In the accompanying drawings; Figure 1 is a side view of my fertilizer distributer and cart; Fig. 2 is a plan view of the same; Fig. 3 is a vertical longitudinal sectional view on an enlarged scale through the device taken on the line 3—3 of Fig. 2; Fig. 4 is a vertical cross sectional view taken on the line 4—4 of Fig. 3; Fig. 5 is a detail horizontal sectional view through the lower portion of the receptacle taken on the line 5—5 of Fig. 3; Fig. 6 is a detail fragmentary sectional view of the portion of the receptacle having the discharge openings and showing the manner in which the openings are uncovered to permit the discharge of the contents of the receptacle; Fig. 7 is a lower side or plan view of the parts shown in Fig. 6; Fig. 8 is a detail perspective view of one of the agitating members of the device; Fig. 9 is a detail sectional view on the line 9—9 of Fig. 4 showing more clearly the manner in which one end of the receptacle is fastened to the spokes of the adjacent wheel of the cart.

In the embodiment of the invention, I provide a cart comprising a frame 1, which is preferably of rectangular form and consists of side bars 2, connected at their rear ends by a rear cross bar 3 and at their forward ends by upper and lower cross bars 4 between which is secured a draft mechanism of any suitable form and which is herein shown as a tongue 5, the inner end of which is secured between the bars 4 and is rigidly fastened by bracing blocks 6.

Bolted or otherwise secured to the lower sides of the opposite side bars 2 of the cart frame are bearing brackets 7. In the bearing brackets 7 of one side of the device is arranged a bearing sleeve 8 in which is revolubly mounted one end of a squared axle 9 the opposite end of which is reduced as indicated at 10 and beyond this cylindrical portion 10 it is threaded to form a cylindrical extension 11 on which is screwed a sleeve or bushing 12 which has a revoluble engagement with the bearing bracket 7 on this side of the frame 1. The sleeve or bushing 12 has on its inner end an annular stop flange 13 and on the outer end thereof is screwed a nut 14 through which and through the end of the sleeve and the extension 11 is arranged a cotter pin 15. On the portion 10 of the axle is arranged a bearing sleeve 16 having on its inner end a wide radially projecting flange 16' the purpose of which will be hereinafter described.

The cart is provided with supporting wheels 17 and 18. The wheel 17 is revolubly mounted on the bearing sleeve 16 of the portion 10 of the axle while the wheel 18 is fixedly mounted on the opposite end of the axle adjacent to the sleeve 8 and in any suitable manner preferably as shown in Fig. 4 by U-shaped clamping bolts 33. These bolts, as hereinafter described, secure the wheel to the head at one end of the mixing receptacle, which latter is fixed to the squared or flat-faced central portion of the axle. By thus arranging the wheels 17 and 18 it will be seen that the wheel 18 acts as a drive wheel for turning the axle while the wheel 17 will run loosely or turn independently of the wheel 18 thereby permitting the cart to be readily turned. On the axle 9 adjacent to the inner side of the hub of the wheel 18 and adjacent to the inner end of the sleeve 16 are arranged stop collars 19.

Arranged on the axle 9 is a mixing receptacle 20 which may be of any suitable shape and which is here shown and is preferably of polygonal form having a plurality of narrow flat sides 21 and two oppositely disposed wider flat sides 22 which connect at their adjacent ends with discharge openings 23 arranged transversely across the receptacle as shown. The ends of the flat sides of the receptacle are engaged with inner heads 24 the shape of which correspond with the cross sectional shape of the receptacle. The discharge openings 23 in the side of the receptacle are closed by sliding cover plates 25 which are slidably engaged with guides 26 secured to the edges of the flat sides 22 whereby said cover plates may be slipped laterally to uncover the discharge openings to a greater or less extent as clearly shown in Figs. 3 and 6 of the drawings. The cover plates 25 are held in closed position by turn buttons 27 or other suitable fastening devices, as shown in Fig. 7 of the drawings. In the side of the receptacle opposite to the discharge opening 23 and in one of the flat sides 21 is a filling opening 28 which is normally closed by a hinged cover plate 29, said plate being held in closed position by a suitable catch 30. It will be noted by reference to Fig. 2 of the drawings that the filling opening 28 is of comparatively small size and is arranged directly opposite the center of the receptacle so that the material placed therein will fall onto the center of the opposite inner side of the receptacle.

Bolted or otherwise rigidly secured to the inner heads 24 of the receptacle are outer circular heads 31. The head 31 on the end of the receptacle adjacent to the wheel 18 is rigidly fastened to the spokes 32 of this wheel by U-shaped clamping bolts 33 as clearly shown in Figs. 4 and 9 of the drawings. The heads 31 and 24 on the opposite end of the receptacle are bolted or otherwise rigidly secured to the flange 16' of the sleeve 16 on which the wheel 17 revolves. By thus fastening the receptacle to the wheels and axle of the cart it will be seen that as the machine is drawn forwardly from place to place that the receptacle will be revolved and the contents thereof turned over and over therein.

By providing the receptacle with the double heads 24 and 31, it is rendered strong and durable; and its several parts are securely fastened together by a plurality of tie rods 31ᵃ, as clearly shown in the drawings.

In order to more thoroughly mix the contents of the receptacle as the same is turned over in the receptacle, I provide a plurality of agitating devices comprising a series of V-shaped inwardly extending ribs 34 and 34ᵃ which extend across the inner side of the receptacle from one head to the other and which are firmly secured to the flat sides of the receptacle in any suitable manner. In addition to the ribs 34 and 34ᵃ, I also provide curved trough shaped blades 35 on the outer ends of which are attaching lugs 36 which are secured to the inner sides of the heads 24. On the opposite or inner ends of the blades 35 are attaching lugs 37 which are secured to the ribs 34 34ᵃ. The blades 35 extend inwardly a suitable distance from the heads 24 and said blades are disposed at an angle and on a curve in a direction with the movement of the receptacle and toward the center of the same, so that the material as it is thrown from one side to the other of the receptacle by the rotary movement thereof will be caught by the blades and thrown back toward the center of the receptacle, thus thoroughly agitating and mixing the contents.

Secured to one of the flat sides 22 of the receptacle are inclined deflecting plates 38, said plates converging from the opposite heads 24 of the receptacle toward the center thereof and toward the central discharge opening 23 in the adjacent side of the receptacle. Secured to the flat side 22 on the opposite side of the receptacle are deflecting plates 39 which are arranged in V-form or at an angle to each other with their diverging ends toward the central opening 23 of the receptacle. By thus arranging the deflecting plates 38 the material falling to the bottom of the receptacle when the latter is stopped in position for discharging the contents will be caught and deflected by said plates toward the discharge opening 23 while the material falling on the opposite side of the opening will be caught in the pocket formed between the diverging plates 39 and will be deflected thereby back toward the discharge opening as will be readily seen by reference to Fig. 5 of the drawings. By forming a plurality of discharge openings 23, any material falling over the sides of the deflecting plates 38 and 39 and onto the flat sides 22 will be directed by said sides to the outer discharge openings through which this material may be removed or discharged from the receptacle.

By means of a mixing device constructed as herein shown and described, earth and fertilizer in the proper proportions or any other material which it is desired to mix may be placed in the receptacle and as the latter is drawn through the field the material will be thoroughly mixed in the manner described so that when the field is reached the mixing will be complete and it is simply necessary to then uncover the discharge openings in the manner described and permit the mixed material to drop into suitable receptacles which may be placed beneath the discharge openings to receive the material.

It will be noted that the ribs 34 and 34ª are disposed over the joints between the engaging edges of the flat sides of the receptacle and thus form fluid tight closures or seals for said joints. It will also be noted that the ribs have one radially disposed or flat side $a$ which is disposed at right angles to the adjacent flat side of the receptacle while the opposite side $b$ of the ribs are formed at an obtuse angle to the adjacent flat side of the receptacle. The ribs 34 on one side of the receptacle are disposed with their flat sides in the direction of the movement of the receptacle said flat sides together with the adjacent flat sides of the receptacle forming pockets which catch the material and carry the same around until brought to a point above the horizontal plane of the center of the receptacle whereupon the material is discharged from said pockets. On the opposite side of the receptacle from the ribs 34 are arranged the ribs 34ª of which there are preferably three, said ribs being arranged with their obtuse sides facing the direction of the movement of the receptacle so that said ribs 34ª are prevented from catching and carrying any of the material around therewith, said material freely slipping from the obtuse sides of the ribs as will be readily understood by reference to Fig. 3 of the drawings.

My improved mixing device is simple, strong, durable and inexpensive in construction, efficient and reliable in operation and is actuated or driven without the use of gears or other complicated mechanism.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. A mixer comprising a wheeled supporting frame, a mixing receptacle operatively mounted in said frame, whereby when the same is driven along the receptacle will be revolved, said receptacle having in one side discharge openings and in its opposite side a filling opening, a plurality of ribs secured to the inner sides of the receptacle between the heads thereof, a plurality of inwardly extending curved agitating blades secured to the ends of the receptacle and arranged to direct the material toward the center of the receptacle as the material is carried around by the rotary motion thereof, and deflecting plates secured to the inner sides of the receptacle and opposite sides of the discharge openings therein, whereby the material is directed toward the discharge openings when the receptacle is turned to a position for discharging the contents therefrom.

2. A device of the character set forth comprising a frame, an axle, two supporting wheels thereon, one being fixed to the axle and the other loose, a receptacle of irregular polygonal shape arranged on the axle to turn with it and said fixed wheel, said receptacle having a plurality of short sides and two long sides spaced apart to provide a discharge opening, a closure for the latter, ribs arranged longitudinally within the receptacle and over the abutting edges of adjacent sides to seal the joints between the latter, each of said ribs having inwardly projecting portions of V-shape in cross section and composed of a substantially radially extending face disposed at an acute angle with respect to the adjacent side of the receptacle, and also having a face converging toward said radially disposed face and disposed at an obtuse angle with respect to the adjacent side of the receptacle, the ribs adjacent to one long side of the receptacle being disposed oppositely to those adjacent the other long side of the receptacle, substantially as and for the purposes set forth.

3. A device of the character set forth comprising a frame, an axle, two supporting wheels thereon, one being fixed to the axle and the other loose, a receptacle of irregular polygonal shape arranged on the axle to turn with it and said fixed wheel, said receptacle having a plurality of short sides and two long sides spaced apart to provide a discharge opening, a closure for the latter, a V-shaped deflecting plate arranged on the inner surface of one long side of the receptacle and having its open end disposed in the direction of said discharge opening, and two oppositely inclined deflecting plates arranged on the inner face of the other long side of the receptacle, said plates extending from the end portions of the receptacle inwardly in converging relation to deflect material toward the center of the discharge opening, substantially as and for the purposes set forth.

In testimony whereof I have hereunto set my hand in presence of two subscribing witnesses.

JAMES H. BRODIE.

Witnesses:
J. A. GRISBAUER, Jr.,
N. CURTIS LAMMOND.

Copies of this patent may be obtained for five cents each, by addressing the "Commissioner of Patents, Washington, D. C."